United States Patent [19]

Schiff

[11] Patent Number: 4,554,679
[45] Date of Patent: Nov. 19, 1985

[54] NOISE REDUCTION SYSTEM FOR A SINGLE SIDEBAND MULTIPLEX SIGNAL

[75] Inventor: Leonard N. Schiff, Lawrenceville, N.J.

[73] Assignee: RCA Corporation, Princeton, N.J.

[21] Appl. No.: 551,922

[22] Filed: Nov. 15, 1983

[51] Int. Cl.[4] .................................................. H04B 1/10
[52] U.S. Cl. ...................................... 455/303; 455/47;
455/63; 455/71; 455/203; 455/245; 455/246;
455/263; 455/311
[58] Field of Search ...................... 455/46, 47, 63, 71,
455/202, 203, 258, 263, 264, 303, 305, 306, 311,
234, 240, 245, 246; 370/74; 179/170 A

[56] References Cited

U.S. PATENT DOCUMENTS

| | | |
|---|---|---|
| 3,271,681 | 9/1966 | McNair ................................ 455/203 |
| 3,447,084 | 5/1969 | Haner et al. ........................ 455/202 |
| 4,069,398 | 1/1978 | Fujie . | |
| 4,207,432 | 6/1980 | Amazawa et al. . | |
| 4,209,748 | 6/1980 | Weber .................................. 455/47 |
| 4,237,485 | 12/1980 | Saito et al. ......................... 358/197 |
| 4,241,452 | 12/1980 | Gibson et al. ...................... 455/263 |
| 4,272,846 | 6/1981 | Muratani et al. ................... 455/296 |
| 4,314,377 | 2/1982 | Kondo et al. ....................... 455/223 |
| 4,328,590 | 5/1982 | Lee ..................................... 455/203 |

Primary Examiner—Marc E. Bookbinder
Attorney, Agent, or Firm—Joseph S. Tripoli; George E. Haas

[57] ABSTRACT

A transmitted signal includes a pilot signal at a given frequency and an information signal occupying a different band of frequencies. A noise reduction system for a signal receiver detects modulation on the pilot signal and generates a signal having a frequency that varies in response to the detected modulation. The system includes an apparatus for combining the received signal with the generated signal to produce a signal at another frequency with reduced frequency noise.

6 Claims, 4 Drawing Figures

NOISE REDUCTION SYSTEM FOR A SINGLE SIDEBAND MULTIPLEX SIGNAL

The present invention relates generally to a communications system for transmitting a single sideband multiplex signal and, more particularly, to a frequency noise reduction apparatus for such a communication system.

The technique of single sideband (SSB) modulation is known to have certain desirable properties. For example, the SSB technique generally requires less bandwidth than other amplitude modulation techniques such as double sideband modulation. This is one reason why the SSB modulation technique is very recently being introduced into satellite and terrestrial microwave communication systems. SSB also can be advantageously used in a frequency division multiplex voice communication system. The single sideband multiplex signal group consists of a large group of voice channels which are frequency division multiplexed together at baseband with each voice channel modulated in single sideband format. Typically, the single sideband frequency multiplexed group is then used to frequency modulate (FM) a carrier in preparation for transmission.

One of the problems encountered in such a transmission system is that of frequency or phase noise caused by short term variations in the local oscillators and the up and down frequency converters which are employed to transmit and receive the information bearing signal. This frequency noise is present not only in signals transmitted via satellite, but also when transmitting a single sideband multiplex signal terrestrially. The problem with frequency noise is that in a single sideband system, the noise frequency modulates each and every one of the multiplex signals of the total multiplex signal group and shows up as frequency or phase noise in each voice or information channel of the group.

In transmitting a single sideband multiplex signal, the actual multiplex signal may have one or a number of unmodulated pilot signals that are inserted at given frequencies so that the demultiplex apparatus will be able to successfully separate the received signal into the various information bearing sub-signals.

SUMMARY OF THE INVENTION

The present invention takes advantage of the fact that the pilot signal ostensibly carries no modulation. Any frequency modulation detected on the pilot at the receiver must therefore be caused by the frequency noise from the up and down converters and other equipment that the signal passes through prior to reception. This frequency noise which is identical to the frequency noise modulating all the individual channels of information of the total multiplex group can be detected by demodulating the pilot and treating the detected frequency noise as if it were an information bearing signal. This detected noise signal can then be used to frequency modulate the entire received multiplex signal in the opposite sense thereby cancelling at least most of the frequency noise on not only the pilot but all the information channels as well.

DESCRIPTION OF THE PREFERRED EMBODIMENTS

Figure 1:
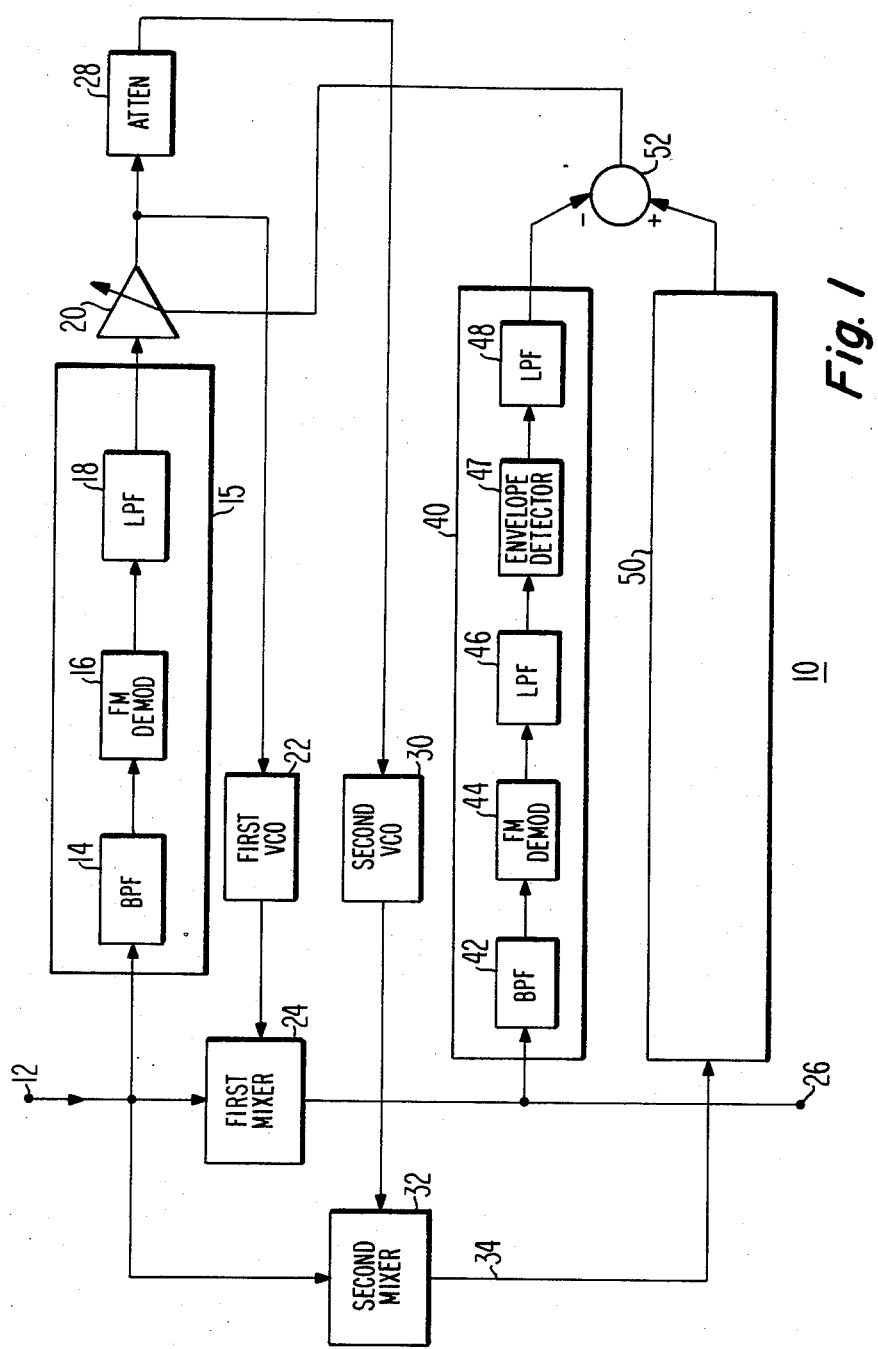
FIG. 1 is a block diagram of one embodiment of the frequency noise reduction apparatus of the present invention.

The description of the present invention is provided in the context of a satellite communication receiver. FIG. 1 shows the basic frequency noise reduction system 10 which can be used as the second intermediate frequency (IF) stage of the receiver, i.e., the first IF signal is mixed down to a second IF signal (alternatively, it can be mixed down to baseband).

The noise reduction system 10 has an input terminal 12 for receiving the output from the first IF stage of the receiver (not shown) which has an output frequency usually at about 70 MHz. The first IF signal is fed into a bandpass filter 14 which separates the pilot frequency from the first IF signal. The output of the bandpass filter 14 containing the pilot signal is connected to the input of an FM demodulator 16 which frequency demodulates the pilot signal. The output of FM demodulator 16 consists of noise of two types. The first type of noise is the frequency noise to be cancelled or reduced by the present invention. The second type is the normal triangular baseband noise associated with receiving a frequency modulated signal in flat thermal noise. The thermal noise contribution is extremely low at low frequency. A low pass filter 18 has an input connected to the output of FM demodulator 16 for filtering out the normal triangular baseband thermal noise. Therefore, the output of the low pass filter 18 will be a signal representing primarily the frequency noise to be cancelled. The band pass filter 14, FM demodulated 16 and the low pass filter 18 comprise a noise separator 15.

The output of the low pass filter 18 is then amplified by a variable gain amplifier 20 having a gain factor G such that the gain equals $20 \log_{10} G$. The output of amplifier 20 is fed to the control input of a first voltage controlled oscillator (VCO) 22 which produces an output signal having a frequency that varies in response to the output of the amplifier 20. The variable frequency output of the first VCO 22 is fed to a first frequency mixer 24 which heterodynes the output of the first VCO 22 with the received signal from the first IF stage at terminal 12. This mixing of frequencies in the first mixer 24 produces a down converted frequency as well as other advantageous results described in more detail below.

The output of amplifier 20 is also connected to the input of an attenuator 28 which attenuates the amplitude (voltage) of the amplifier's output. The attenuated output is fed to the control input of a second voltage controlled oscillator 30 to produce a second variable frequency signal. The second variable frequency signal is sent to a second frequency mixer 32 which mixes the second variable frequency with the received signal from the first IF stage. The output signal from the second IF mixer 32, which is present on line 34, results from the heterodyning of the signal from the second VCO 30 and the first IF signal to produce a pseudo second intermediate frequency.

The output of the first mixer 24 is connected to signal noise strength monitor 40 which monitors the noise reduction of the signal at the output of the first mixer 24. The monitor 40 comprises bandpass filter 42, FM demodulator 44, low pass filter 46, envelope detector 47 and a secondary low pass filter 48. The input signal to the monitor 40 is coupled to the bandpass filter 42 which separates out the pilot signal from the input signal. The pilot signal is then demodulated by FM demodulator 44, whose output signal is further filtered by the low pass filter 46 to eliminate most of the thermal noise which may be present in the signal. The first three elements 42–46 of the monitor 40 are similar to the noise separator 15, previously described. The output signal of the monitor low pass filter 46 is essentially the residue frequency noise which may remain in the output signal from the first mixer 24 as a result of incomplete noise cancellation. The strength of that noise is then determined by feeding the output signal to a conventional envelope detector 47 and a secondary low pass filter 48 to time average the signal. The output of the low pass filter is a measure of the degree of reduction of the frequency noise. Similarly, the output signal of the second mixer 32 is processed by another signal noise strength monitor 50 which is identical to the first monitor 40 except that it operates at the frequency range of the second mixer output. The output of the other monitor 50 represents the strength of the residual frequency noise in the output signal from the second mixer 32.

Figure 2:
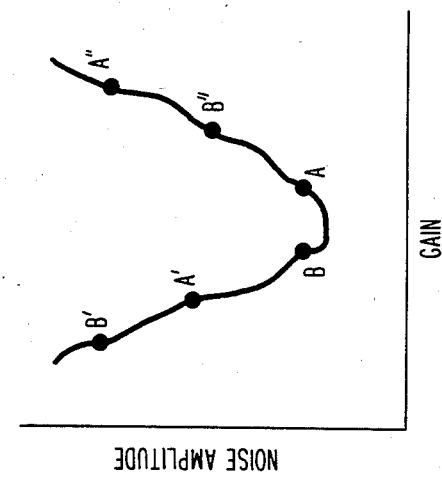
FIG. 2 is a graph illustrating the reduction in frequency noise as a function of the gain of an amplifier in the embodiment of FIG. 1.

The magnitude of the residual frequency noise is plotted in FIG. 2 as a function of the gain of the amplifier 20. Points A, A' and A'' on the graph represent the noise amplitude measurement at the output of the first monitor 40 and points B, B' and B'' on the graph represent the amplitude of the noise measurement at the output of the second monitor 50 for various amplifier gains.

The outputs of the two monitors 40 and 50 are compared (i.e., subtracted) by comparator 52 having an output which is connected to the gain control input of amplifier 20 to complete a feedback control loop.

During the operation of the noise reduction system 10 of FIG. 1, the output of the first IF stage of the receiver (not shown) is applied to the input terminal 12. The bandpass filter 14 filters out the pilot signal from the received signal in the first IF. The pilot signal is then demodulated by FM demodulator 16 and a substantial amount of the thermal noise is filtered out by the low pass filter 18. The output of the low pass filter 18 is representative of the frequency noise in the received signal. Amplifier 20 amplifies the signal which is then applied to the first voltage controlled oscillator 22. The voltage controlled oscillator 22 produces an output frequency which is mixed with the signal from the first IF stage at the first frequency mixer 24 to produce the second IF signal on terminal 26.

If the gain factor G of the amplifier 20 is properly set, the first voltage controlled oscillator 22 will produce a signal having a frequency which when mixed with the input from the first IF stage in mixer 24 will effectively cancel the frequency noise present in the first IF signal. The gain factor G can be obtained as follows: a signal which causes a one Hertz peak deviation for the pilot signal produces $K_1$ volts at the output of the FM demodulator 16. Neglecting insertion losses of the two filters 14 and 18, the signal is amplified to $G \times K_1$ volts by the amplifier. The first VCO 22 has a gain constant of $K_2$ Hertz per volt so that the frequency shift at the output of the first VCO 22 due to a one Hertz deviation at the first IF signal is $(K_1 \times G \times K_2)$ Hertz. This shift is opposite in direction from the direction of the shift of the first IF since the output of the first mixer 24 is the difference between the frequency of the received signal from the first IF stage and the frequency of the signal supplied by the first VCO 22. Therefore, if $K_1 \times G \times K_2$ equals unity the frequency noise will be exactly cancelled in the absence of any thermal noise. With thermal noise present, as it always is, this reduction will not be precise; hence, the noise amplitude curve in FIG. 2 does not touch the abscissa. In addition, the gain factor G of amplifier 20 is not stable and may drift with either temperature and/or time such that the reduction of the noise can suffer as a result of these drifts.

In order to counteract the effects of the drifts in gain in amplifier 20, the noise in the output of the first frequency mixer 24 is measured by the signal noise strength monitor 40. This is accomplished by feeding the resultant signal from the first mixer 24 through the monitor bandpass filter 42 to select the pilot signal which is then frequency demodulated by demodulator 44 and filtered by a low pass filter 46 having an output signal representative of the residual thermal noise in the second IF signal. The amplitude of this noise is then measured by envelope detector 47 and low pass filter 48 to produce a sensed signal level representative of point A on the curve of FIG. 2.

Similarly, the output of the amplifier 20 is attenuated by attenuator 28 and used to control a second VCO 30 whose output signal is heterodyned with the received signal from the first IF stage in the second mixer 32 to produce a pseudo second IF signal having a frequency slightly different than the second IF signal at output terminal 26. The residual frequency noise in the pseudo second IF signal is measured by a second signal noise strength monitor 50 which produces an output similar to that of the first monitor 40 and which is represented by point B on the noise amplitude curve of FIG. 2. The signal levels representing the residual noise in the second IF signal and the pseudo second IF signal are compared at comparator 52 to produce an output representative of the difference between the two noise levels. The output of the comparator 52 controls the gain of the amplifier 20 such that if the comparator output is zero (ie. noise levels from the monitors are equal) no change in the gain occurs. This state is represented by points A and B in FIG. 2.

The output of the amplifier 20 is used to control the first voltage controlled oscillator 22 in a fashion in which the frequency of the output of the voltage controlled oscillator varies dependent upon the frequency noise detected in the output of the first IF stage. When the output of the first VCO 22 is mixed with the input from the first IF stage in the first mixer 24, the resultant output not only is a down converted IF signal but one in which the frequency noise has been substantially reduced. The extent to which the frequency noise has been cancelled is dependent upon the gain of amplifier 20.

If the reduction in the noise in the output of the first frequency mixer 24 is not optimized, the output of the noise monitors 40 and 50 will not be at levels A and B, respectively, but for example, may be at levels A' and B' on the noise amplitude curve in FIG. 2. The comparator 52 will detect the inequality between the two levels and produce an output which will increase the gain of amplifier 20. The amplifier gain will increase thereby producing a change in the output frequency of the first VCO 22 which will produce a slight change in the frequency of the output signal from the first frequency mixer 24 to cancel more of the residual frequency noise. The gain of amplifier 20 will continue to be increased until the measured signal noise levels reach points A and B on the graph of FIG. 2. At this time, the outputs of the two monitors 40 and 50 are equal, and the output of comparator 52 is zero, producing no further change in the gain of amplifier 20. In this state, the gain of the amplifier 20 will produce an output signal from the first VCO 22 which when mixed with the received signal will cancel a significant portion of the frequency noise.

Similarly, if the residual noise in the second IF signal at the output of the first mixer 24 produces an output from the two monitors 40 and 50 represented by points A" and B" in FIG. 2, the gain of the amplifier 20 would be decreased until the two monitors measure d residual noise levels at points A and B. When the residual noise levels are at points A and B, the gain of amplifier 20 remains constant and the frequency noise reduction has been optimized.

The system 10 in FIG. 1 sets the gain of amplifier 20 at level A on the noise amplifier curve of FIG. 2. It is apparent that this setting of the gain and thereby the noise reduction factor may not provide maximum reduction when the lowest point on the noise amplitude curve lies between points A and B. Even if the attenuation of the output of the amplifier 20 is relatively small to produce only a slight gain difference between points A and B, the optimum gain for noise reduction may still lie between those two points. An alternate embodiment of the present noise reduction system is shown in FIG. 3 and utilizes a third gain factor C which is in between points A and B (FIG. 4) to control the noise reduction.

Figure 3:
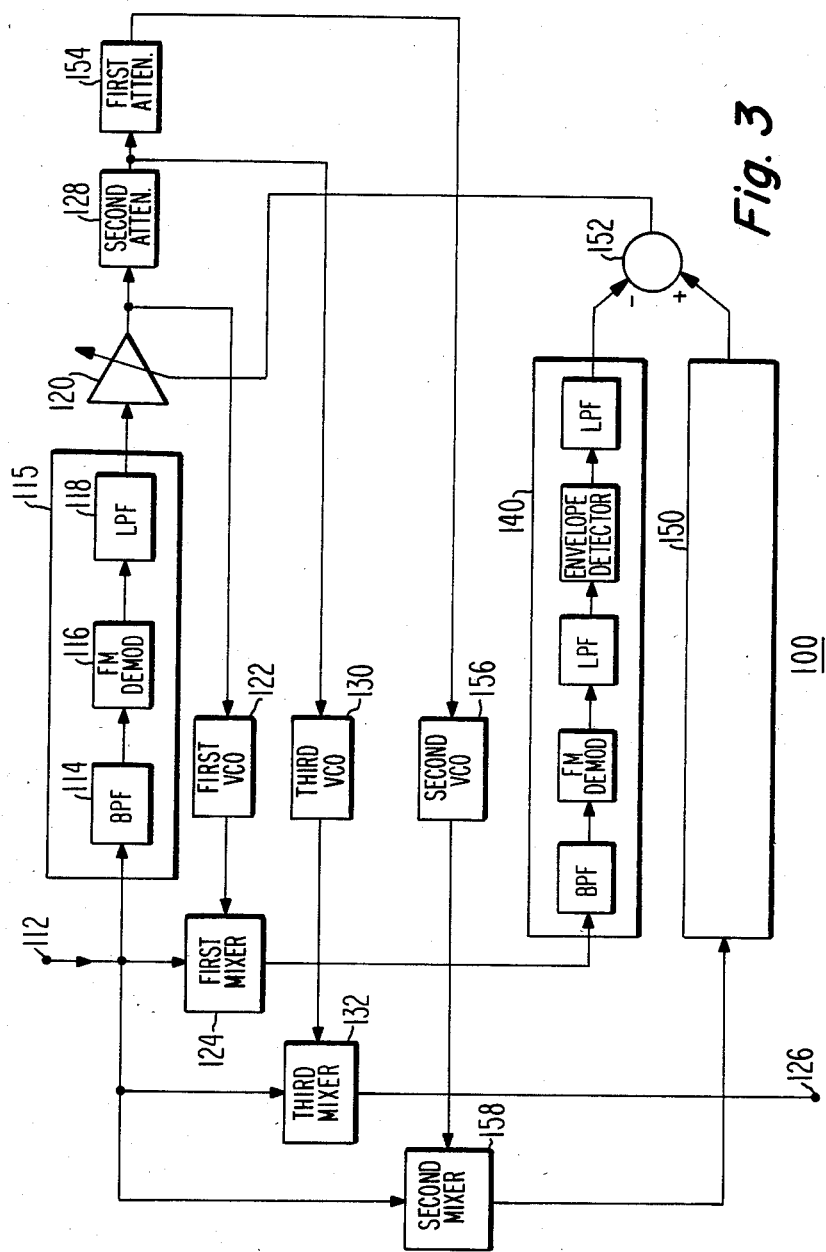
FIG. 3 is another embodiment of the present invention.

With reference to FIG. 3, the frequency noise reduction system 100 provides an input terminal 112 for applying the received signal from the first IF stage of the receiver (not shown). The input terminal 112 is connected to a noise separator 115 similar to the noise separator 15 in the system 10 of FIG. 1. Specifically, the noise separator 115 comprises a bandpass filter 114, an FM demodulator 116 and a low pass filter 118. The output of the noise separator 115 from the low pass filter 118 is coupled to the signal input of a variable gain amplifier 120. The output of amplifier 120 is fed to the control input of a first voltage controlled oscillator 122 which produces a signal at its output having a frequency which varies in response to the output signal of amplifier 120. The output signal from the first VCO 122 is fed to one input of a first frequency mixer 124 which has another input connected to the input terminal 112. The output of the first mixer 124, which is the heterodyned mix of the two input signals, is fed to a first signal noise strength monitor 140 which is similar to the monitor 40 of FIG. 1.

The output of amplifier 120 is also connected to first and second attenuators 128 and 154 which decrease the signal from the amplifier 120 by given amounts. The input of the second attenuator is directly connected to the output of the amplifier 120. The output of the second attenuator 128 is connected to the first attenuator 154 which further attenuates the output from the amplifier 120 by a given amount. Alternatively, the input of the first attenuator 154 could be directly connected to the output of the amplifier 120 in which case the first attenuator would attenuate the amplifier output by a greater amount than the second attenuator 128. The output terminal of the first attenuator 154 is fed to a second voltage controlled oscillator 156 to produce a second signal having a frequency which varies in response to the output signal from the first attenuator. This second signal is sent to a second frequency mixer 158 which has another input connected to the input terminal 112. The second frequency mixer 158 heterodynes the two input signals to produce an output signal which is fed to a second signal noise strength monitor 150 which is similar to the first monitor 140. The outputs from the two monitors 140 and 150 indicate the level of residual frequency noise present in the outputs of the first and second mixers 124 and 158. The monitor outputs are compared by a comparator 152 which provides an output signal representative of the difference between the outputs from the two monitors. The comparator output signal is fed to the gain control input of amplifier 120.

The output of the second attenuator 128 is fed to a third voltage controlled oscillator 130 which produces a signal which varies in frequency in response to the output signal from the amplifier 120 and the attenuator 128. This signal from the third voltage controlled oscillator is fed to one input of a third frequency mixer 132 having another input connected to the input terminal 112. The output of the third mixer 132 appears at an output terminal 126 as the second IF signal and the output of the noise reduction system 100.

The embodiment of the invention in FIG. 3 operates in much the same way as the embodiment of FIG. 1. Specifically, the noise reduction system 100 employs the noise separator 115 to detect the frequency noise that is present on the pilot signal. The output of the noise separator 115 is actually the modulation present on the unmodulated pilot signal which is representative of the frequency noise present in the entire received signal from the first IF stage. This noise signal is amplified by amplifier 120 and used to control the first VCO 122. The output of the first VCO is mixed with the first IF signal in the first frequency mixer 124 to provide a pseudo second IF signal which is fed to the first monitor 140. As in the embodiment of FIG. 1, the first monitor measures the signal strength of the noise present in the pseudo second IF signal.

The output signal from the amplifier 120 is attenuated in the second attenuator 128 and fed to a third VCO 130 to produce a signal which is heterodyned with the first IF signal in a third mixer 132 to produce the actual second IF signal for the receiver and the output of the noise reduction system 100.

The signal at the output of the second attenuator 128 is further attenuated by first attenuator 154 and fed to the second VCO 156. The frequency produced by the second VCO is mixed with the input signal from terminal 112 in the second frequency mixer 158 to produce another pseudo second IF signal. The strength of the noise present in this pseudo second IF signal is measured by a second noise strength monitor 150.

Figure 4:
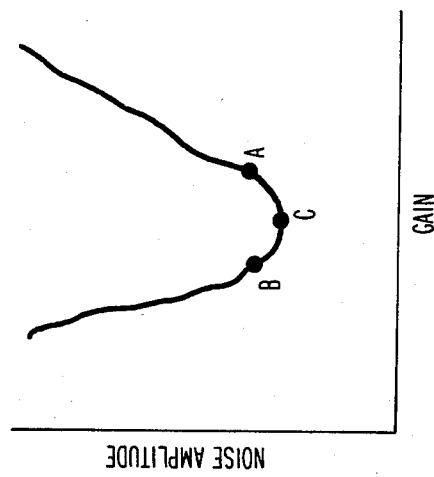
FIG. 4 is a graph illustrating the reduction in frequency noise versus the gain of an amplifier in the embodiment of FIG. 3.

With reference to FIG. 4, the output of the first monitor 140 appears as point A on the graph of the noise amplitude versus gain of amplifier 120. The measurement of the signal noise strength appearing at the output of the second monitor 150 is represented by point B on the graph. The gain which is employed to control the third VCO 130 and thereby produce the actual second IF signal at the output terminal 126 is represented by point C on the graph. As is apparent from the graph, when the noise reduction system has reached stability, that is, the output of monitors 140 and 150 are equal so that comparator 152 does not produce an output nor a change in the gain of amplifier 20, points A and B will be reached. Furthermore, since the output of the third frequency mixer 132 is controlled by a level between the control levels of the first and second VCO's 122 and 156, the noise present in the output of the third mixer will be at point C in FIG. 4. The noise reduction will be optimized because the gain at point C produces a maximum noise reduction.

Both of the embodiments described above utilize a pair of control loops to monitor the noise reduction. Alternatively, a single loop could be employed wherein the output of the noise strength monitor is fed to a microprocessor. The microprocessor would be programmed to step the gain of the amplifier and compare the new noise level with the noise level at the previous gain step. The lowest noise level would be detected by the microprocessor and the stepping terminated thereby producing maximum noise reduction.

What is claimed is:

1. A noise reduction system for an apparatus for receiving a signal having a pilot signal at a given frequency and an information signal occupying a band of frequencies separated from said given frequency, said system comprising:
   means for frequency demodulating the pilot signal;
   a variable gain amplifier having an input coupled to the output of the pilot signal demodulating means;
   a first voltage controlled oscillator having a control input connected to the output of said amplifier;
   first means for attenuating the output of the variable gain amplifier;
   a second voltage controlled oscillator having a control input connected to the output of said first attenuating means;
   a first frequency mixer for combining the received signal with the output of the first voltage controlled oscillator;
   a second frequency mixer for combining the received signal with the output of the second voltage controlled oscillator; and
   means for controlling the gain of said amplifier in response to the noise present in the outputs of the first and second frequency mixers.

2. The noise reduction system according to claim 1 wherein the means for controlling the gain of said amplifier comprises:
   a first means for determining the amount of noise in the output of the first frequency mixer;
   a second means for determining the amount of noise in the output of the second frequency mixer; and
   a comparator for comparing the amounts of noise determined by the first and second noise determining means and controlling the gain of said amplifier in response to the comparison.

3. The noise reduction system according to claim 1 further comprising:
   a second means for attenuating the output of the variable gain amplifier;
   a third voltage controlled oscillator having a control input connected to the output of the second attenuating means; and
   a third frequency mixer for combining the received signal with the output of the third voltage controlled oscillator.

4. The noise reduction system according to claim 3 wherein the means for controlling the gain of said amplifier comprises:
   a first means for determining the amount of noise in the output of the first frequency mixer;
   a second means for determining the amount of noise in the output of the second frequency mixer; and
   a comparator for comparing the amounts of noise determined by the first and second noise determining means and controlling the gain of said amplifier in response to the comparison.

5. In a communication receiver for processing a received signal modulated by a pilot signal at a given frequency and an information signal occupying a certain band of frequencies separated from said given frequency, a noise reduction apparatus comprising:
   a first means for detecting modulation on said pilot signal present in said received signal;
   means for generating a signal having a frequency which varies in response to the amount of modulation detected on said pilot signal;
   means for mixing the generated signal with the received signal so that the frequencies of the two signals combine to produce an output signal which is lower in frequency than said received signal;
   a second means for detecting modulation on the pilot signal present in said output signal; and
   means for varying the amplitude of the detected modulation from the first means for detecting modulation in response to the output of the second means for detecting modulation.

6. The apparatus as in claim 5 wherein the second detecting means comprises:
   means for separating the pilot signal from the output signal;
   an FM demodulator to which the separated pilot signal is applied; and
   an envelope detector to which the output of the FM demodulator is applied.

* * * * *